United States Patent
Frey

(10) Patent No.: US 9,469,061 B2
(45) Date of Patent: Oct. 18, 2016

(54) ONE-PIECE VENTABLE PISTON FOR A DISPENSING APPARATUS, A DISPENSING APPARATUS WITH SAME, AND METHOD OF MAKING SAME

(71) Applicant: PLAS-PAK INDUSTRIES INC., Norwich, CT (US)

(72) Inventor: Charles M. Frey, Groton, CT (US)

(73) Assignee: PLAS-PAK INDUSTRIES INC, Norwich, CT (US)

( * ) Notice: Subject to any disclaimer, the term of this patent is extended or adjusted under 35 U.S.C. 154(b) by 322 days.

(21) Appl. No.: 14/164,854

(22) Filed: Jan. 27, 2014

(65) Prior Publication Data

US 2014/0208939 A1 Jul. 31, 2014

Related U.S. Application Data

(60) Provisional application No. 61/758,385, filed on Jan. 30, 2013.

(51) Int. Cl.
*B29C 45/40* (2006.01)
*B05C 17/005* (2006.01)
*B65D 83/00* (2006.01)

(52) U.S. Cl.
CPC ......... *B29C 45/40* (2013.01); *B05C 17/00579* (2013.01); *B65D 83/005* (2013.01); *B65D 2205/04* (2013.01)

(58) Field of Classification Search
CPC ..... B65D 83/005; B65D 2205/04; F16J 1/09
USPC ................................ 92/181 P; 222/386, 387
See application file for complete search history.

(56) References Cited

U.S. PATENT DOCUMENTS

| 4,819,836 A | 4/1989 | Meckenstock |
| 5,178,305 A * | 1/1993 | Keller ............... B05C 17/00579 |
| | | 222/386 |
| 5,878,922 A | 3/1999 | Boring |
| 6,196,424 B1 | 3/2001 | Bougamont et al. |

(Continued)

FOREIGN PATENT DOCUMENTS

| DE | 10235599 A1 | 2/2004 |
| DE | 202006015313 U1 | 3/2008 |

(Continued)

OTHER PUBLICATIONS

International Search Report of the International Searching Authority for Application No. PCT/US2014/013307; Date of Mailing Mar. 4, 2014.

(Continued)

*Primary Examiner* — Thomas E Lazo
(74) *Attorney, Agent, or Firm* — Cantor Colburn LLP

(57) ABSTRACT

A piston has a one-piece body having a first portion and a second portion. The second portion is integrally formed with the first portion, is flexibly movable between a first position and a second position relative to the first portion, and is biased toward the first position. The first portion has an orifice, and the second portion has a seal member. When the second portion is disposed in the first position, the seal member is disposed in a sealed arrangement with the orifice, and when the second portion is disposed in the second position, the seal member is disposed in an unsealed arrangement with the orifice.

23 Claims, 13 Drawing Sheets

(56) References Cited

U.S. PATENT DOCUMENTS

| | | |
|---|---|---|
| 6,464,112 B2 | 10/2002 | Summons et al. |
| 6,494,348 B2 | 12/2002 | Prestele |
| 6,598,766 B1 | 7/2003 | Brugner |
| 6,688,793 B2 | 2/2004 | Goyet |
| 6,848,480 B2 | 2/2005 | Brennan |
| 6,899,254 B1 | 5/2005 | Sandholm et al. |
| 6,991,000 B2 | 1/2006 | Jeter et al. |
| 7,353,972 B2 | 4/2008 | Nehren |
| 7,621,428 B2 | 11/2009 | Springhorn |
| 7,874,464 B2 | 1/2011 | Prague et al. |
| 7,909,211 B2 | 3/2011 | Springhorn |
| 2002/0162859 A1 | 11/2002 | Summons et al. |
| 2005/0029306 A1 | 2/2005 | Brennan |
| 2005/0066809 A1* | 3/2005 | Nehren ............. B05C 17/00576 91/422 |
| 2008/0203112 A1 | 8/2008 | Peuker et al. |
| 2008/0230565 A1 | 9/2008 | Hohmann et al. |
| 2010/0200617 A1 | 8/2010 | Schar |
| 2010/0283822 A1 | 11/2010 | Arnold et al. |
| 2010/0294795 A1* | 11/2010 | Boehm .................. A61C 5/062 222/386 |
| 2011/0146836 A1 | 6/2011 | Turner |
| 2012/0061424 A1* | 3/2012 | Obrist ............... B05C 17/00579 222/386 |
| 2012/0181300 A1 | 7/2012 | Maxa |

FOREIGN PATENT DOCUMENTS

| | | |
|---|---|---|
| EP | 2468415 A1 | 6/2012 |
| WO | 2009061884 A1 | 5/2009 |

OTHER PUBLICATIONS

Written Opinion of the International Searching Authority for Application No. PCT/US2014/013307, Date of Mailing Mar. 4, 2014.

\* cited by examiner

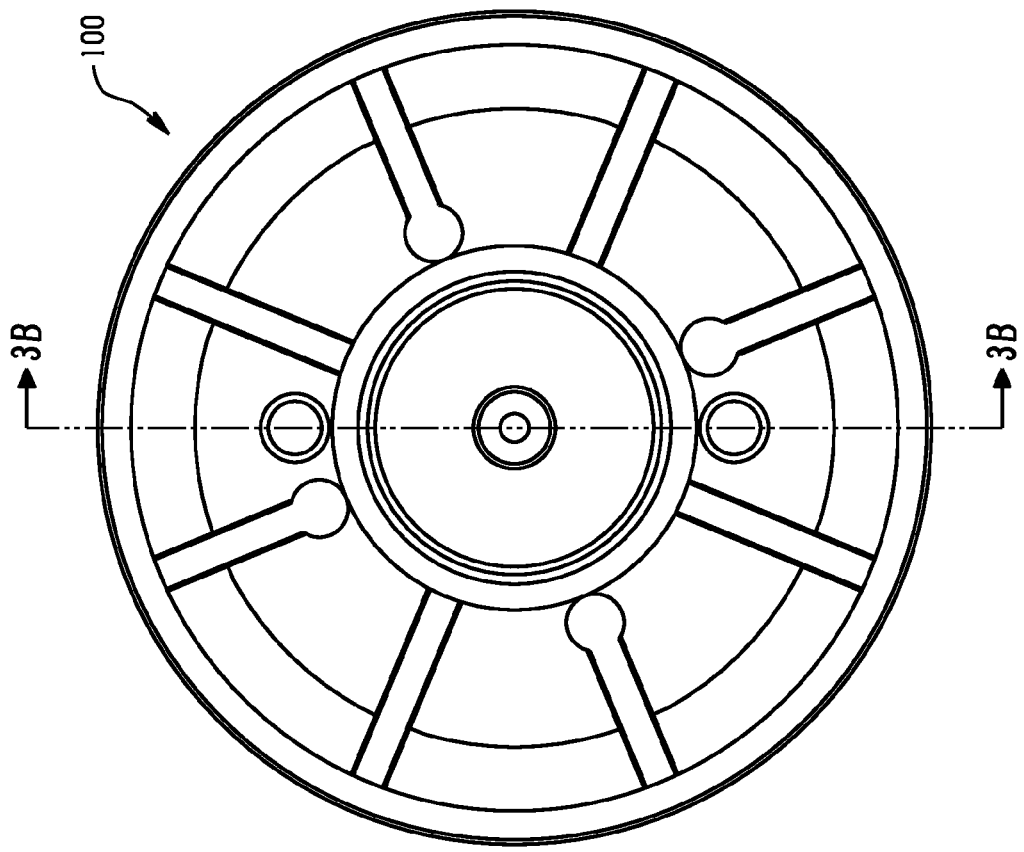
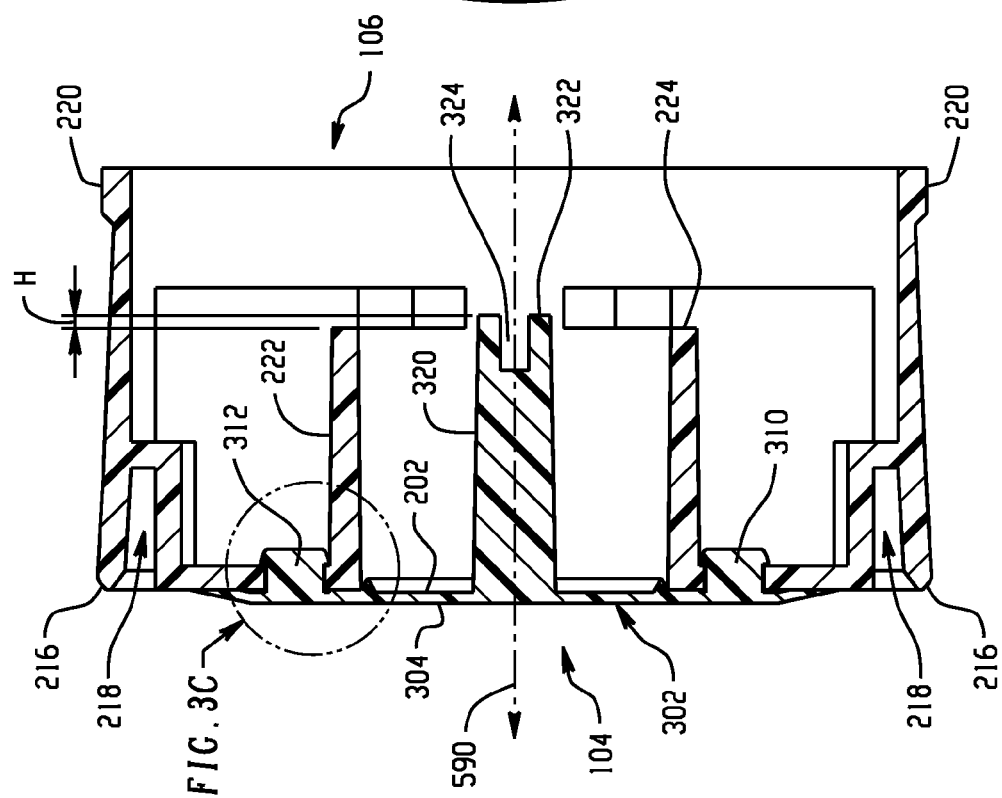
Fig. 3A
Fig. 3B

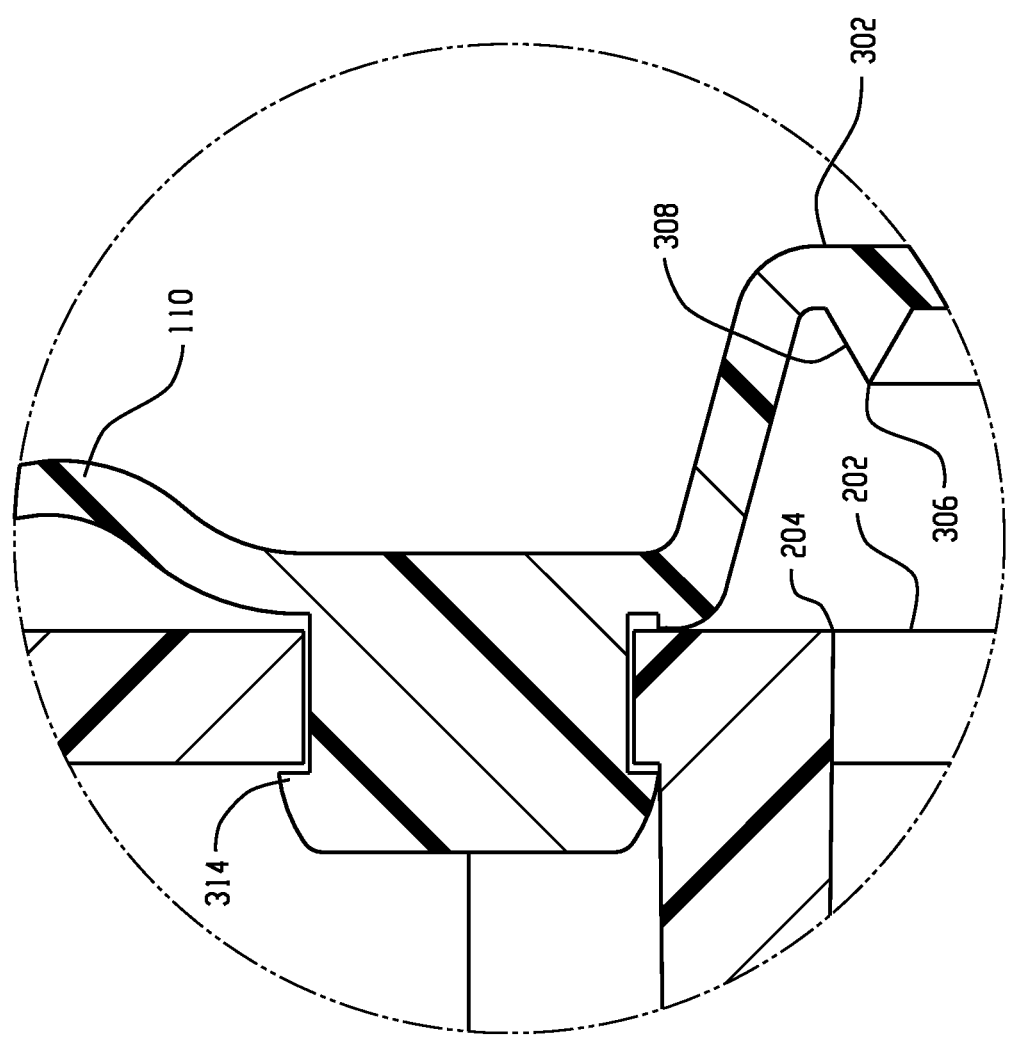

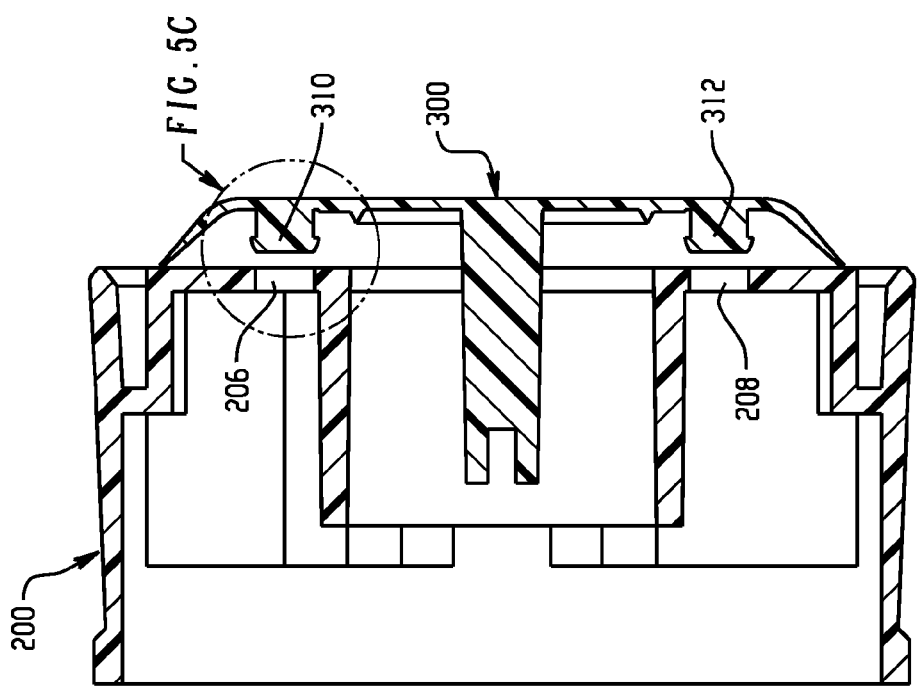
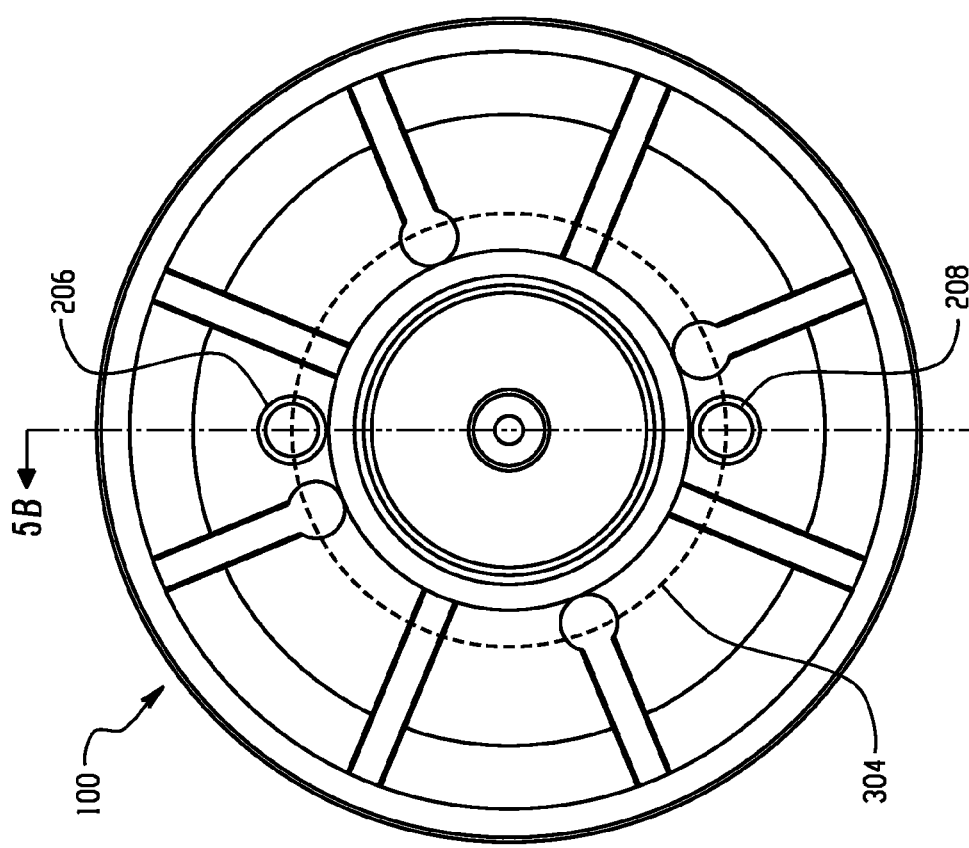
Fig. 5B
Fig. 5A

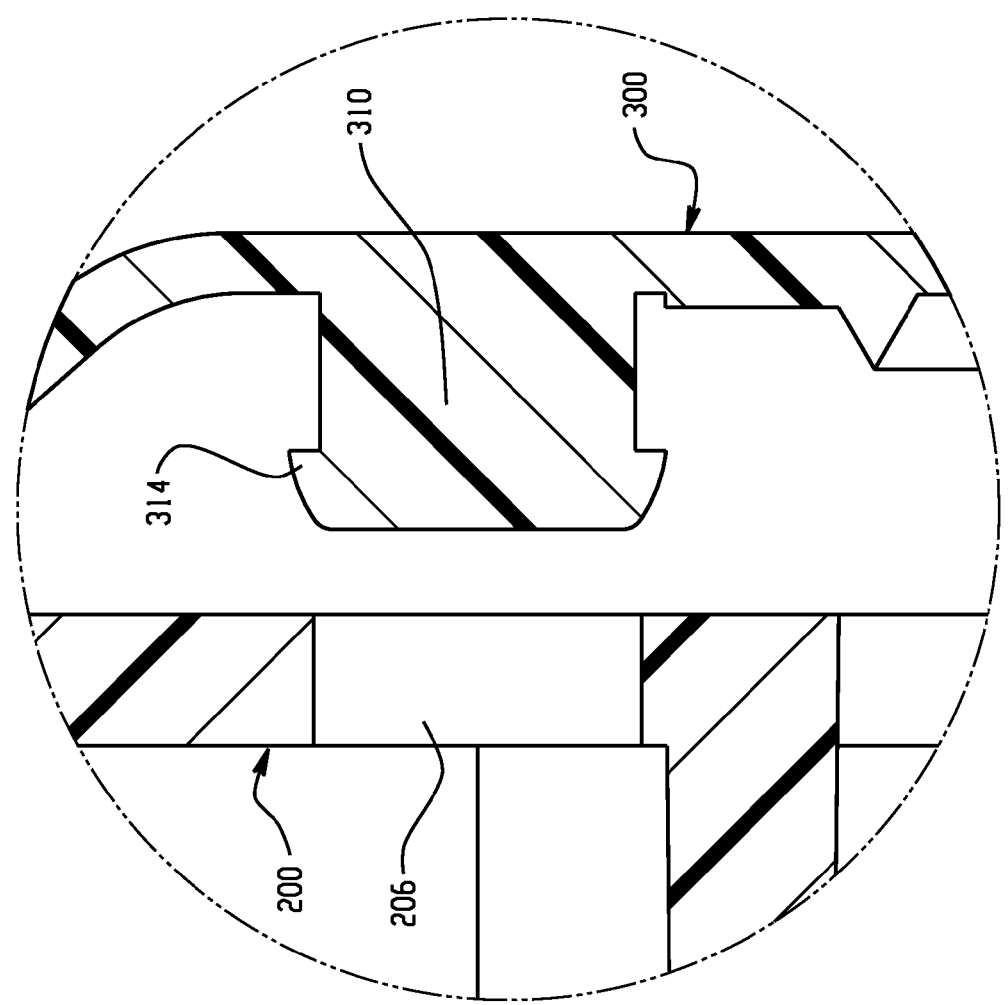

ONE-PIECE VENTABLE PISTON FOR A DISPENSING APPARATUS, A DISPENSING APPARATUS WITH SAME, AND METHOD OF MAKING SAME

CROSS REFERENCE TO RELATED APPLICATIONS

This application claims the benefit of U.S. Provisional Application Ser. No. 61/758,385, filed Jan. 30, 2013, which is incorporated herein by reference in its entirety.

BACKGROUND OF THE INVENTION

The present disclosure relates generally to a dispensing apparatus, and particularly to a one-piece ventable piston for use in a dispensing apparatus.

Syringes and like dispensers in which a plunger or push rod is pushed to dispense product from a cavity are widely used for many applications from medicine to industrial activities. Generally, such dispensers will have a barrel or other container providing the cavity, a dispensing opening at one end, an opposing open end for filling of the product therein, and a piston for driving the product through the dispensing opening. Because it is desirable to avoid spillage of product during the filling process, air tends to get trapped ahead of the piston as it is pushed into the cavity after the cavity has been appropriately filled with the product. The trapped air will contract/expand under storage, shipping and dispensing conditions. This can result in the piston being pushed out of the cartridge, causing the contents to leak. During dispensing this air can create lead lag or bubbles, which will adversely affect the proper mix ratio. In order to eliminate the air from the cavity, various procedures have been utilized including a vent in the piston which is subsequently closed. If the vent is not completely closed, seepage of product past the vent will occur when the syringe is put into use. If the air is not completely evacuated from the syringe, the trapped air may interfere with the operation of the dispenser by causing disruptions in a smooth flow of product, While existing vent means for a syringe-type dispensing apparatus may be suitable for their intended purpose, the art relating to a syringe-type dispensing apparatus would be advanced with a venting arrangement that does not require fabrication and assembly of multiple parts.

This background information is provided to reveal information believed by the applicant to be of possible relevance to the present invention. No admission is necessarily intended, nor should be construed, that any of the preceding information constitutes prior art against the present invention.

BRIEF DESCRIPTION OF THE INVENTION

In an embodiment of the invention a piston has a one-piece body having a first portion and a second portion. The second portion is integrally formed with the first portion, is flexibly movable between a first position and a second position relative to the first portion, and is biased toward the first position. The first portion has an orifice, and the second portion has a seal member. When the second portion is disposed in the first position, the seal member is disposed in a sealed arrangement with the orifice, and when the second portion is disposed in the second position, the seal member is disposed in an unsealed arrangement with the orifice.

In an embodiment of the invention a dispensing apparatus includes a hollow barrel shaped body having an inner wall and a discharge opening at one end, the inner wall defining a boundary of a cavity of the body, and a piston with a one-piece body having a first portion and a second portion according to the foregoing description.

An embodiment of the invention includes a method of making a piston with a one-piece body having a first portion and a second portion according to the foregoing description. In a closed mold that defines a cavity, the mold having a first side closed upon a second side along a first axis, the mold having first and second slider plates closed in molding engagement with the cavity along a second axis perpendicular to the first axis, a flowable thermoplastic material is injected into the cavity, filling the cavity with the flowable thermoplastic. Then, the flowable thermoplastic material is substantially cured in the cavity to form the piston. Then, the first and second slider plates are disengaged in a direction along the second axis with respect to the filled cavity. Then, the first and second sides of the mold are separated in a direction along the first axis to open the mold. Then, the piston is ejected from the mold.

An embodiment of the invention includes a method of making a piston with a one-piece body having a first portion and a second portion according to the foregoing description. In a closed mold that defines a cavity, the mold having a first side closed upon a second side along a first axis, the mold having a pin movable along the first axis and axially oriented with respect to an axis of the elongated projection of the second portion, the mold having first and second slider plates closed in molding engagement with the cavity along a second axis perpendicular to the first axis, a flowable thermoplastic material is injected into the cavity, filling the cavity with the flowable thermoplastic. Then, the flowable thermoplastic material is cured in the cavity to form the piston in a first state of cure. Then, the first and second slider plates are disengaged in a direction along the second axis with respect to the filled cavity. Then, the pin is disengaged in a direction along the first axis with respect to the filled cavity, the second portion is pushed or pulled toward the first portion and the flowable thermoplastic material is cured in the cavity to form the piston in a second state of cure, and then the first and second sides of the mold are separated in a direction along the first axis to open the mold. Then, the piston is ejected from the mold.

BRIEF DESCRIPTION OF THE DRAWINGS

Referring to the exemplary non-limiting drawings wherein like elements are numbered alike in the accompanying Figures:

FIG. 3A depicts a rear plan view of the piston of FIGS. 1 and 2, having first and second portions disposed in a first closed position, in accordance with an embodiment of the invention;

FIG. 3B depicts a section view of the piston of FIG. 3A;

FIG. 4C depicts a detail view of a portion of the piston of FIG. 4B;

FIG. 5A depicts a rear plan view of the piston of FIGS. 1 and 2, having first and second portions disposed in a pre-closed intermediate molded state, in accordance with an embodiment of the invention;

FIG. 5B depicts a section view of the piston of FIG. 5A;

FIG. 5C depicts a detail view of a portion of the piston of FIG. 5B;

DETAILED DESCRIPTION OF THE INVENTION

Although the following detailed description contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

An embodiment of the invention, as shown and described by the various figures and accompanying text, provides a ventable piston having a valve biased in a closed position and being formed having a one-piece body. As used herein, the term one-piece body means a body having no parts that can be completely separated from the body during normal operation and containing no parts that are not integrally formed, where the term integrally formed means formed with material common to the rest of the body, such as a body produced from a plastic molding process for example.

Figure 4B:
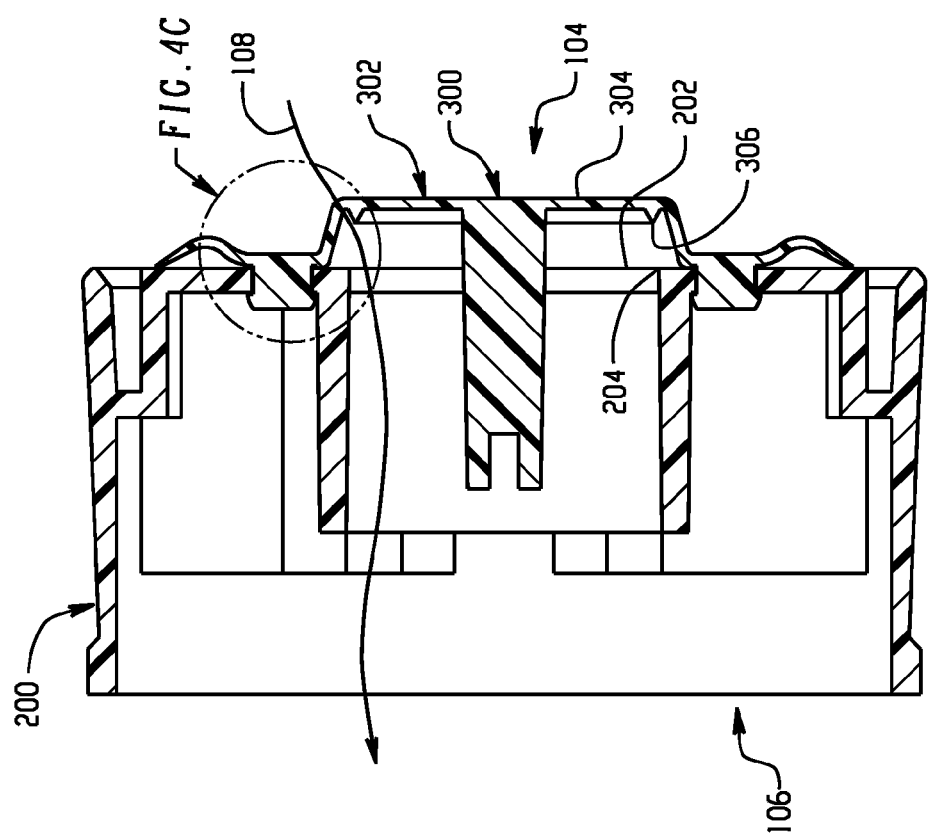
FIG. 4B depicts a section view of the piston of FIG. 4A.
Figure 4A:
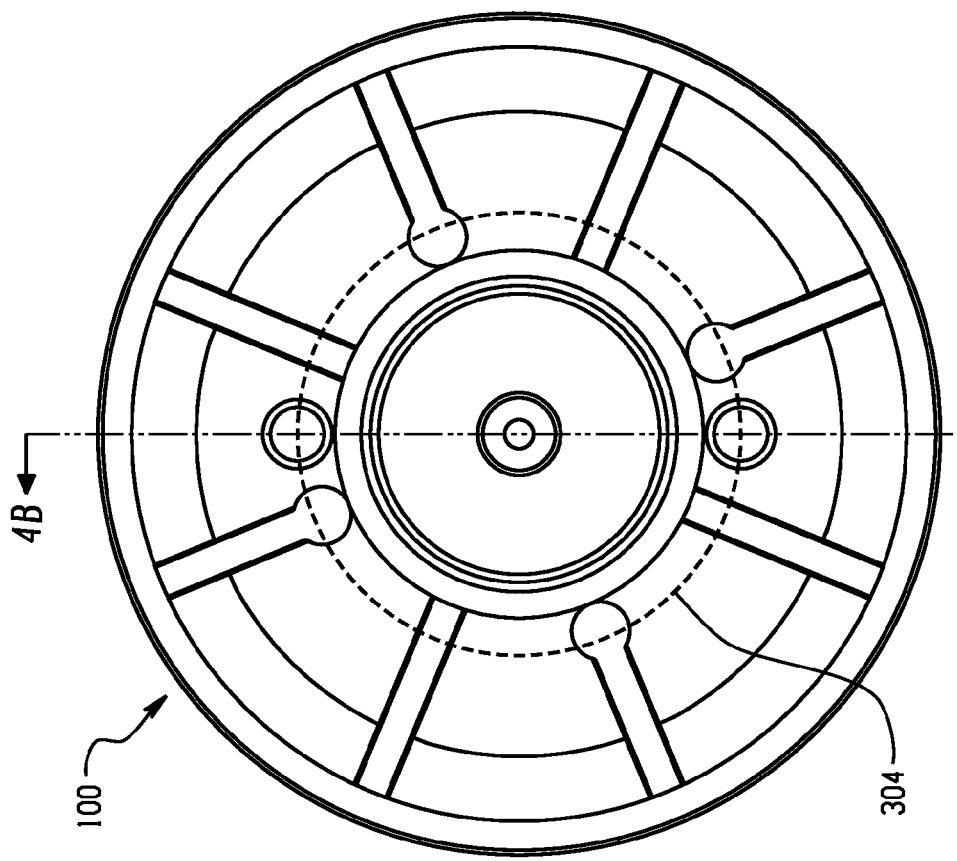
FIG. 4A depicts a rear plan view of the piston of FIGS. 1 and 2, having first and second portions disposed in a second open position, in accordance with an embodiment of the invention.

With reference to FIGS. 1, 2, 3A, 3B, 3C, 4A, 4B and 4C, a piston 100 is depicted in a front perspective view (FIG. 1), a rear perspective view (FIG. 2), a first rear plan view (FIG. 3A), a first section view (FIG. 3B), a first section detail view (FIG. 3C), a second rear plan view (FIG. 4A), a second section view (FIG. 4B), and a second section detail view (FIG. 4C).

The piston 100 has a one-piece body 102 having a first portion 200 and a second portion 300. The second portion 300 is integrally formed with the first portion 200, is flexibly movable between a first closed position (FIGS. 1, 2, 3A, 3B, 3C) and a second open position (FIGS. 4A, 4B, 4C) relative to the first portion 200, and is biased toward the first closed position (FIGS. 1, 2, 3A, 3B, 3C) in a manner discussed below. In an embodiment, the one-piece body 102 is substantially cylindrical in shape about a central axis 590, that is, the one-piece body 102 is structurally configured to slideably engage with interior walls of a cylindrical chamber of a dispensing apparatus, which will be discussed further below.

The one-piece body 102 has a front side 104 and a rear side 106. When in use, the front side 104 would be inserted first into the dispensing apparatus (discussed further below), and a dispensing force would be applied to the rear side 106. The terms front side and rear side will be used herein in a consistent manner to also refer to front/rear sides of other structural features of the piston 100.

The first portion 200 includes an orifice 202, and the second portion 300 includes a seal member 302 (best seen with reference to FIGS. 4B and 4C). When the second portion 300 is disposed in the first closed position, the seal member 302 is disposed in a sealed arrangement with the orifice 202, and when the second portion 300 is disposed in the second open position, the seal member 302 is disposed in an unsealed arrangement with the orifice 202. In an embodiment, the orifice 202 is circular.

As an aside and in view of the description herein, it will be recognized that FIGS. 4B and 4C depict the seal member 302 of the second portion 300 in an exaggerated open position relative to the orifice 202 of the first portion 200. When in use, the seal member 302 needs only to be open a sufficient amount to let air pass through the orifice 202 when the seal member 302 is moved to the second open position, which will be discussed further below.

In an embodiment, and best seen with reference to FIGS. 4B and 4C, the seal member 302 includes a pressure plate portion 304 disposed on a front side of the second portion 300, and a peripheral projection 306 disposed on a rear side of the pressure plate portion 304. While pressure plate portion 304 is depicted having a circular shape, best seen with reference to FIG. 1, it will be appreciated that other shapes suitable for a purpose disclosed herein may be employed, such as oval for example. In an embodiment, the pressure plate portion 304 is oriented substantially perpendicular to the central axis 590 of the one-piece body 102. The outer diameter of the pressure plate portion 304 may differ from one dispensing apparatus to another depending on the application and product to be dispensed. When the second portion 300 is disposed in the first closed position (FIGS. 3B and 3C), the peripheral projection 306 is disposed in a sealed arrangement with the orifice 202 of the first portion 200, and when the second portion 300 is disposed in the second open position (FIGS. 4B and 4C), the peripheral projection 306 is disposed in an unsealed arrangement with the orifice 202 of the first portion 200. In an embodiment, the peripheral projection 306 is a circular peripheral projection that sealably mates with the circular orifice 202. In an embodiment the peripheral projection 306 has a sloped outer surface 308 that sealably engages with the edge 204 of the orifice 202. When in use to dispense material from a dispensing apparatus, the material being dispensed exerts a reactionary force on the pressure plate portion 304, which in turn drives the peripheral projection 306 tightly against the edge 204 of the orifice 202 to prevent rearward seepage of material through the orifice 202. The outer surface 308 of the peripheral projection 306 acts as a valve seal, and the edge 204 of the orifice 202 acts as a valve seat, with the seal member 302 in cooperation with the front surface 210 of the first portion 200 serving as the valve.

As will be appreciated from the foregoing, when the second portion 300 is disposed in the second open position, the one-piece body 102 provides a gas flow passage 108 that is structurally configured to permit gas flow from a front side of the second portion 300 to a rear side of the first portion 200 through the orifice 202, best seen with reference to FIG. 4B.

Referring now to FIGS. 5A, 5B and 5C in combination with FIGS. 3A, 3B, 3C, 4A, 4B and 4C, the first portion 200 includes two engagement features which in an embodiment are in the form of two orifices 206, 208, and the second portion 300 includes two reciprocal engagement features which in an embodiment are in the form of two projections 310, 312, each having a snap-fit feature 314. When the second portion 300 is disposed in each of the first position (FIGS. 3A, 3B and 3C) and the second position (FIGS. 4A, 4B and 4C), the reciprocal engagement features, projections 310, 312 with snap-fit features 314 for example, are constrained by the engagement features, orifices 206, 208 for example, by virtue of each snap-fit feature 314 being disposed in snap-fit engagement with respective rear side edges of the two orifices 206, 208, as depicted in FIGS. 3B, 3C, 4B and 4C.

In view of the foregoing, it will be appreciated that FIGS. 5A, 5B and 5C depict the piston 100 in a pre-closed intermediate molded state prior to the projections 310, 312 having been snap-fit into their respective orifices 206, 208, and that FIGS. 3A, 3B, 3C, 4A, 4B and 4C depict the piston 100 in its operable closed and open states, respectively.

Figure 1:
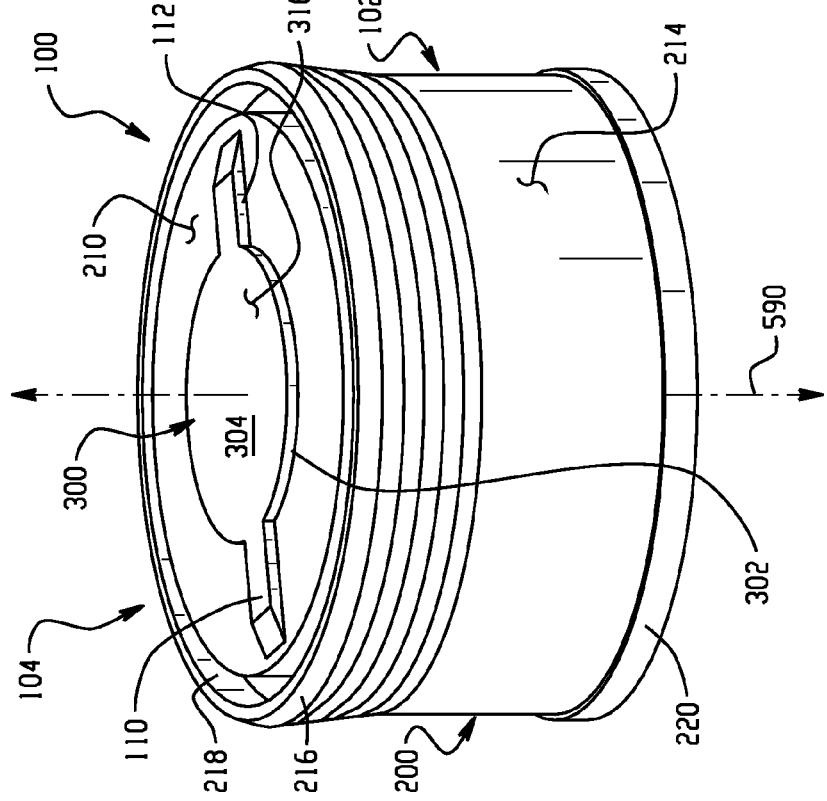
FIG. 1 depicts a front perspective view of a one-piece ventable piston in accordance with an embodiment of the invention.
Figure 3C:
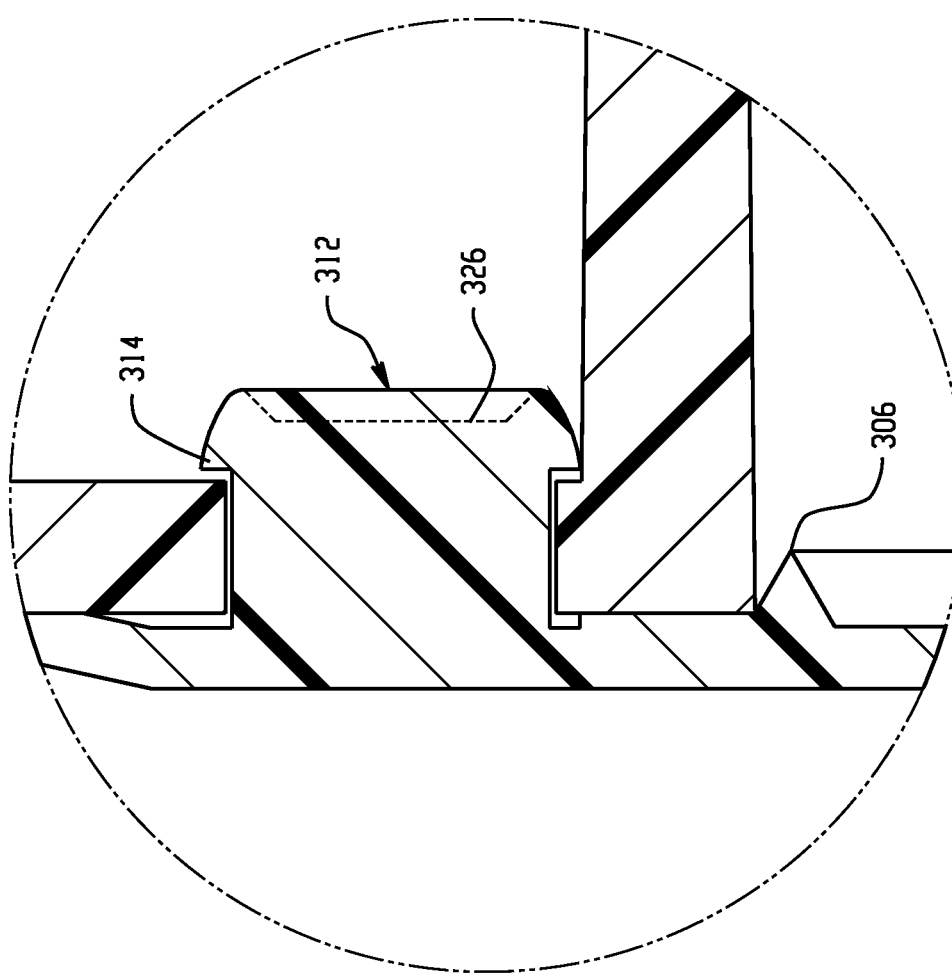
FIG. 3C depicts a detail view of a portion of the piston of FIG. 3B.

With reference to FIGS. 1 and 4C, the second portion 300 is integrally formed with the first portion 200 via a plurality of flexible radially extending bands 110, 112, which in combination with projections 310, 312 being snap-fit into orifices 206, 208, bias the second portion 300 toward the first position 200. As illustrated, projections 310, 312 are disposed on a rear side of respective ones of the plurality of flexible radially extending bands 110, 112.

With brief reference to the section views of FIGS. 3B, 4B and 5B, it will be appreciated that each section view is viewed from a first cut plane that cuts through the flexible radially extending bands 110, 112 and the pressure plate portion 304 of the seal member 302. It will also be appreciated that a second cut plane (not illustrated) arranged orthogonal to the first cut plane and containing the central axis 590 (see FIG. 1) will cut through the pressure plate portion 304 but not through the radially extending bands 110, 112.

Figure 2:
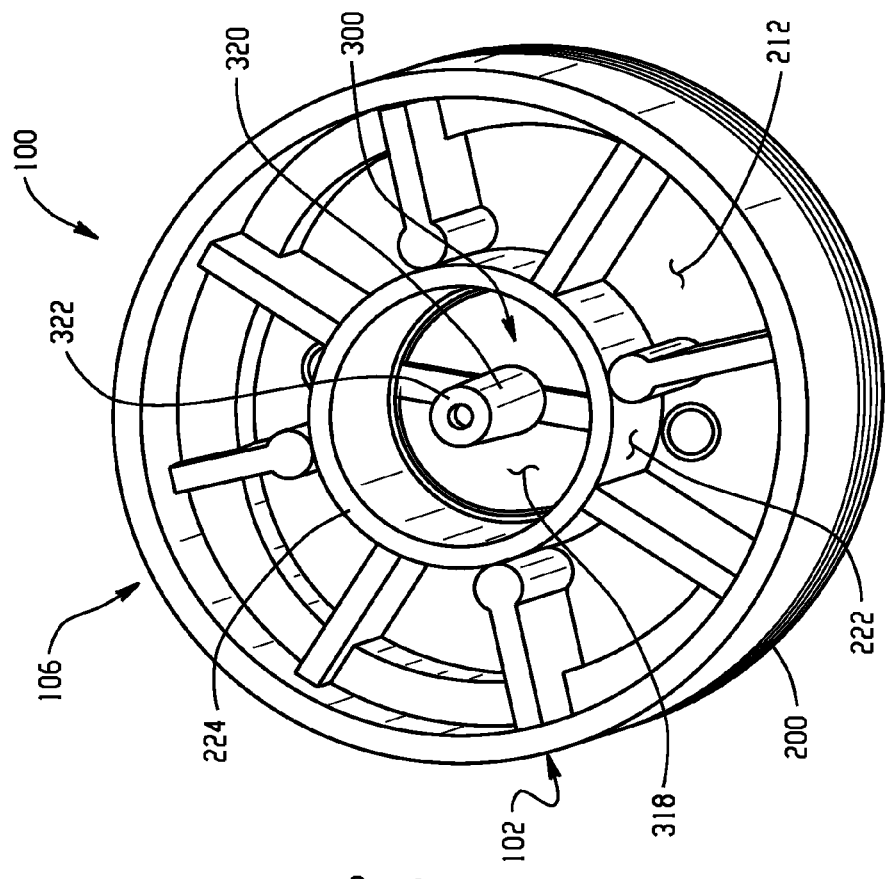
FIG. 2 depicts a rear perspective view of the piston of FIG. 1 in accordance with an embodiment of the invention.

With reference to FIGS. 1, 2 and 3B, the first portion 200 includes a front surface 210, a rear surface 212, and a peripheral wall surface 214, and the second portion 300 includes a front surface 316 and a rear surface 318, where the rear surface 318 of the second portion 300 is disposed oriented toward the front surface 210 of the first portion 200. In an embodiment, the peripheral wall surface 214 extends between the front side and the rear side of the first portion 200 and includes a first circumferential seal member 216 disposed proximate the front side of the first portion 200. In an embodiment, the first portion 200 includes an annular space 218 disposed between the first circumferential seal member 216 and the front surface 210. The first circumferential seal member 216 is made using a resilient material that will provide a seal between the piston 100 and an interior wall of a cylindrical chamber of a dispensing apparatus suitable for a purpose disclosed herein. The annular space 218 is operable to provide additional flexibility to the first circumferential seal member 216 to facilitate improved sealing over a piston absent such an annular space 218. In an embodiment, the peripheral wall surface 214 includes a second circumferential seal member 220 disposed proximate the rear end of the first portion 200, which facilitates additional sealing and/or stability of the piston 100 as the piston 100 is pushed forward when in use in a dispensing apparatus.

With reference to FIGS. 2 and 3B, an embodiment of the first portion 200 includes a circumferential wall 222 disposed around a perimeter of the orifice 202 of the first portion 200, where the circumferential wall 222 has an end 224 that extends toward the rear side 106 of the first portion 200. An embodiment of the second portion 300 has an elongated projection 320 disposed within the circumferential wall 222 of the first portion 200, where the elongated projection 320 has an end 322 that extends further toward the rear side 106 of the first portion 200 than does the end 224 of the circumferential wall 222 of the first portion 200 when the second portion 300 is disposed in the first closed position, as indicated by dimension "H" in FIG. 3B. By appropriate selection of dimension "H", a flat ended cylindrical tool (not shown), such as a filler push rod for example, having an outer diameter about equal to that of the circumferential wall 222 can be inserted into the rear side of the piston 100 until it rests upon the end 224 of the circumferential wall 222, thereby pushing on the end 322 of the elongated projection 320 to facilitate movement of the seal member 302 of the second portion 300 a distance "H" from the first closed position to the second open position to allow trapped air to escape from the dispensing apparatus during a fill operation. In an embodiment, dimension "H" is about 0.010 inches.

Notwithstanding the foregoing discussion regarding dimension "H", it will be appreciated that other end configurations of the aforementioned tool may be employed that does not necessarily require the elongated projection 320 to have an end 322 that extends further toward the rear side 106 of the first portion 200 than does the end 224 of the circumferential wall 222 of the first portion 200 when the second portion 300 is disposed in the first closed position, as discussed above. Alternatively, the end 322 may be recessed relative to the end 224, with the end configuration of the tool be appropriately shaped to produce the desired movement of the seal member 302 from the first closed position to the second open position as herein described for purposes of venting.

In an embodiment, the elongated projection 320 has an axially oriented cavity 324 open at the end 322 (the rear side) of the elongated projection 320. The cavity 324 provides a means for pulling the second portion 300 toward the first portion 200 during a molding process, which will be discussed further below.

Figure 6A:
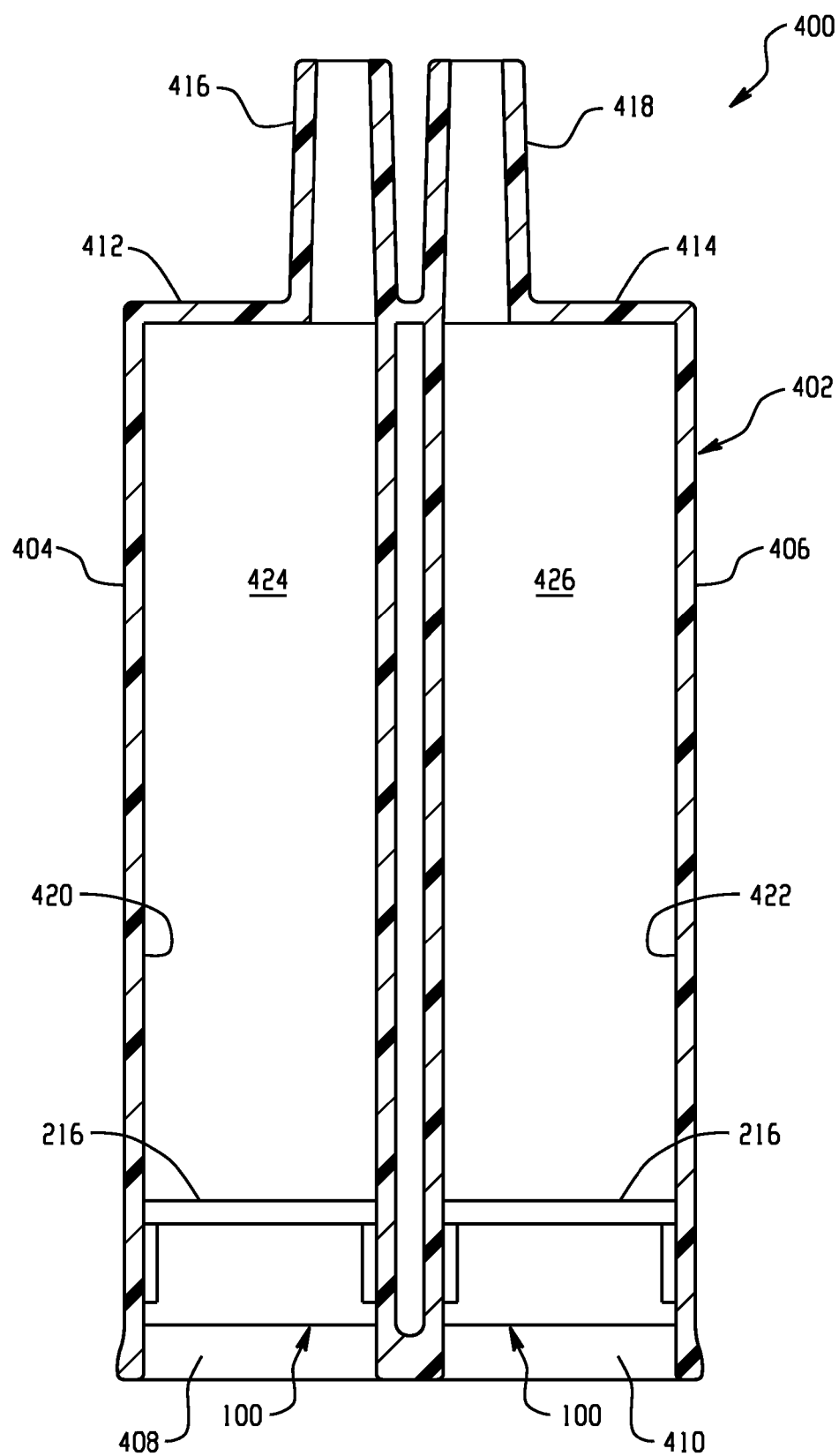
FIG. 6A depicts a dispensing apparatus with a piston of FIGS. 1 and 2, in accordance with an embodiment of the invention.
Figure 8:
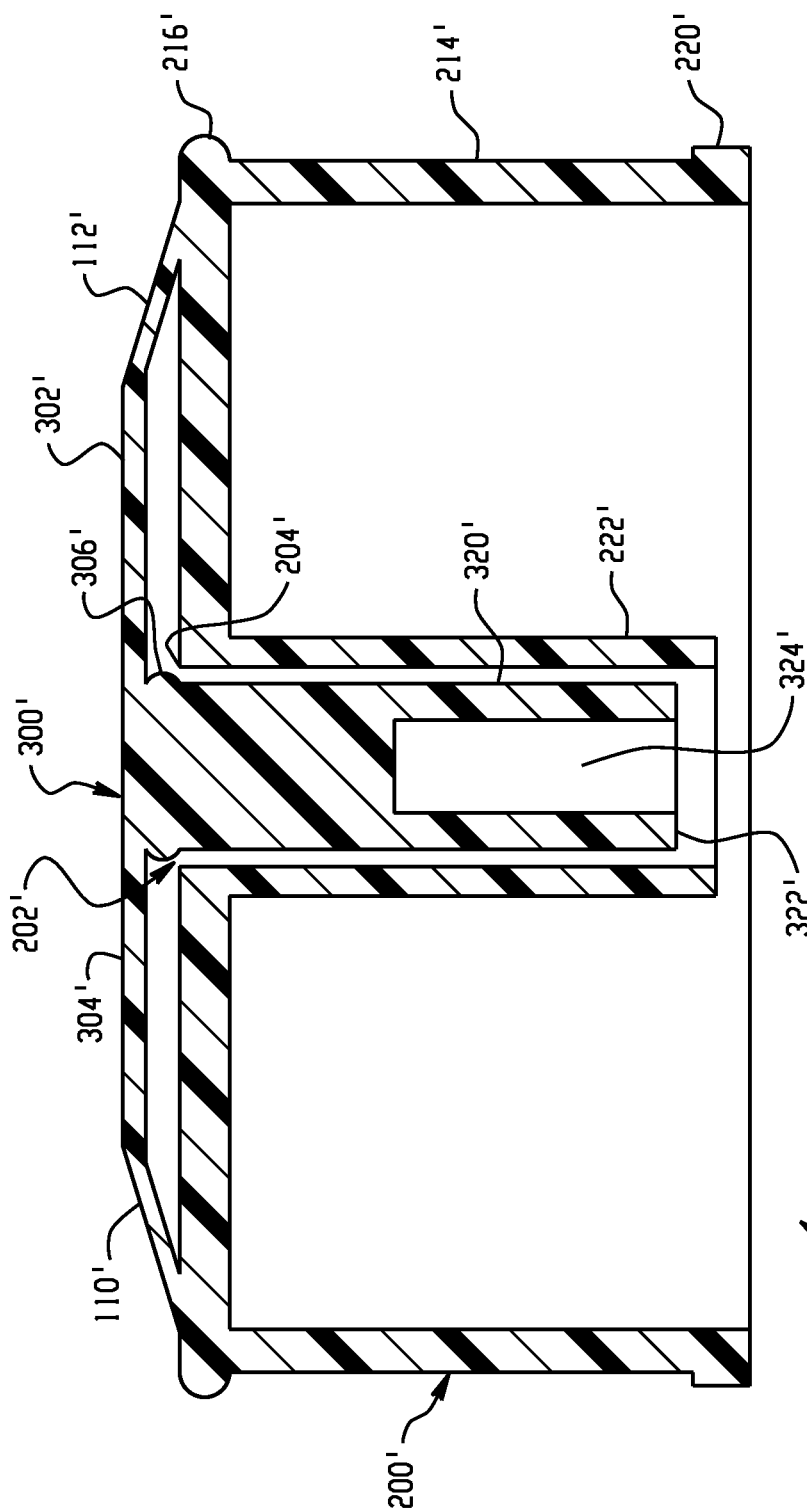
FIG. 8 depicts an alternative piston to that of FIGS. 1 and 2, in accordance with an embodiment of the invention.

With reference now to FIG. 6A, a dispensing apparatus 400 includes a dual barrel syringe body, generally indicated by the reference numeral 402, constructed having two, parallel, cylindrical, hollow barrels 404, 406 having, respectively, open filling ends 408, 410 and discharge ends 412, 414. Discharge nozzles 416, 418 axially extend from respective ones of the discharge ends 412, 414. In an embodiment, barrels 404, 406 are conjoined at the filling ends 408, 410 and at the discharge ends 412, 414. Each barrel 404, 406 has a respective inner cylindrical wall 420, 422 that defines a boundary of a respective cavity 424, 426 of each barrel 404, 406. A piston 100 (or 100' depicted in FIG. 8, or 100a depicted in FIGS. 9A, 9B, 9C) in accordance with an embodiment disclosed herein is slideably disposed within each of the cavities 424, 426, with respective ones of the first circumferential seal member 216 (or 216' depicted in FIG. 8, or 216a depicted in FIGS. 9A, 9B, 9C) being disposed in a slideable sealing arrangement with the respective interior walls 420, 422 of the cylindrical cavities 424, 426. While FIG. 6A depicts a dispensing apparatus 400 having a dual barrel syringe body arrangement 402, it will be appreciated that the scope of the invention is not so limited, and encompasses a dispensing apparatus having any number of barrels, such as one, two, three or more, for example. While FIG. 6A depicts a dispensing apparatus 400 having two equally sized barrels 404, 406 and two equally sized pistons 100, it will be appreciated that the scope of the invention is not so limited, and encompasses a dispensing apparatus having two or more different sized barrels for dispensing multiple components in different mix ratios.

During use, a first material of a two-component system is placed via filling end 408 into the first cavity 424 of the first barrel 404, and a second material of the two-component system is placed via filling end 410 into the second cavity 426 of the second barrel 406, prior to the pistons 100 being inserted into the respective filling ends 408, 410. After inserting pistons 100 front-forward into each respective filler end 408, 410, a filler push rod (not shown) having a pusher body with a front end dimensioned to bear only on the elongated projection 320 in a manner discussed above is inserted into a respective filler end 408, 410 and pushed against the piston 100 to allow trapped air to vent through the passage 108 about the periphery of the peripheral projection 306 of the seal member 302. Upon completion of the venting process, a dispenser push rod (not shown) having a pusher body with a front end dimensioned to bear only on the first portion 200 of the piston 100 so that the second portion 300 stays in a first closed position, can then be used to dispense the contained materials.

Figure 6B:
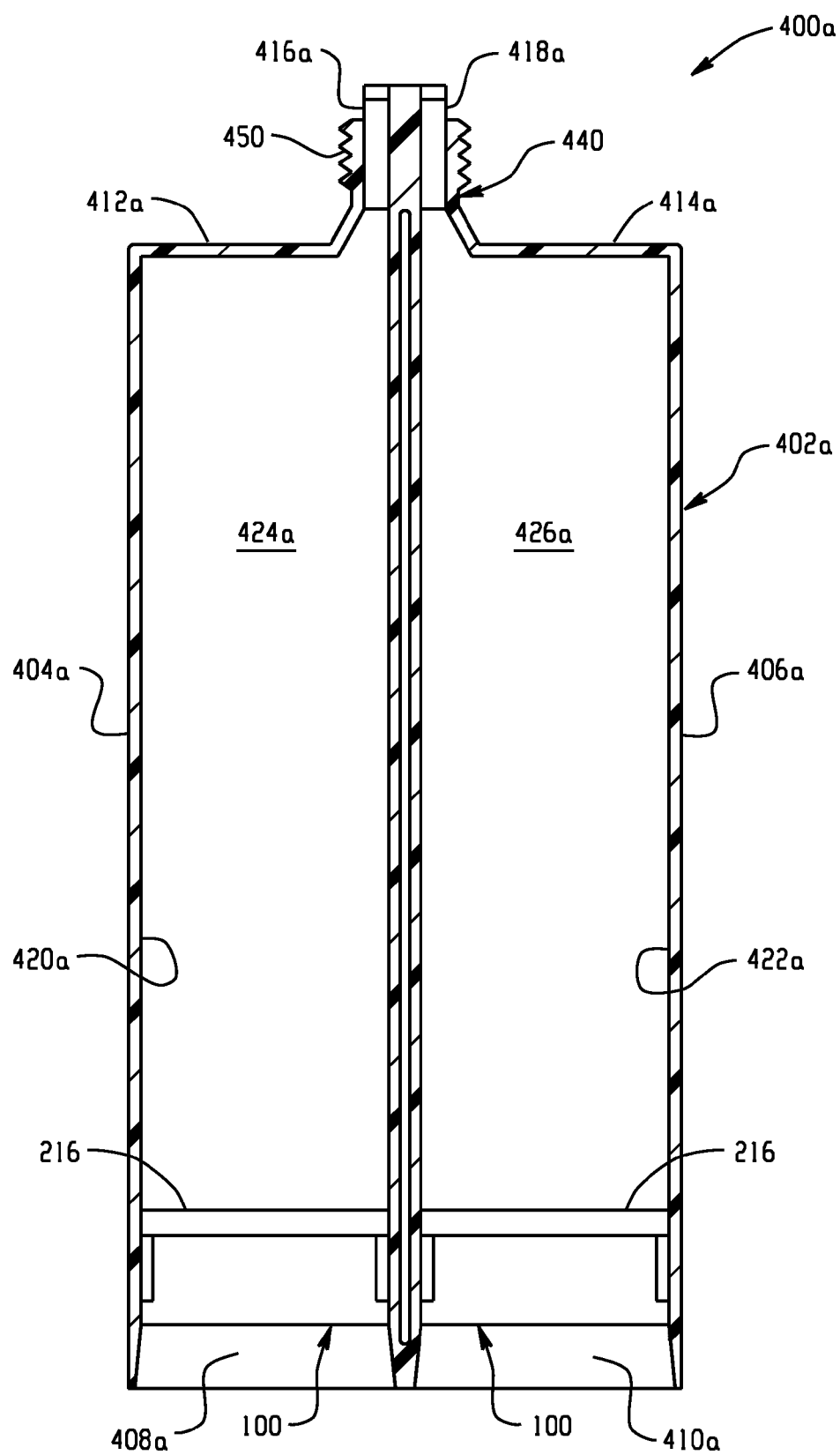
FIG. 6B depicts a dispensing apparatus alternative to that depicted in FIG. 6A, in accordance with an embodiment of the invention.

FIG. 6B depicts a dispensing apparatus 400a similar to that of FIG. 6A, where like elements between FIGS. 6B and 6A are identified by the same base numeral having an "a" suffix in FIG. 6B. Dispensing apparatus 400a includes a dual cartridge barrel, generally indicated by the reference numeral 402a, constructed having two, parallel, cylindrical, hollow barrels 404a, 406a having, respectively, open filling ends 408a, 410a and discharge ends 412a, 414a. Discharge nozzles 416a, 418a axially extend from respective ones of the discharge ends 412a, 414a. In an embodiment, barrels 404a, 406a are conjoined at the filling ends 408a, 410a and at the discharge ends 412a, 414a. Each barrel 404a, 406a has a respective inner cylindrical wall 420a, 422a that defines a boundary of a respective cavity 424a, 426a of each barrel 404a, 406a. A piston 100 (or 100' depicted in FIG. 8, or 100a depicted in FIGS. 9A, 9B, 9C) in accordance with an embodiment disclosed herein is slideably disposed within each of the cavities 424a, 426a, with respective ones of the first circumferential seal member 216 (or 216' depicted in FIG. 8, or 216a depicted in FIGS. 9A, 9B, 9C) being disposed in a slideable sealing arrangement with the respective interior walls 420a, 422a of the cylindrical cavities 424a, 426a. While FIG. 6B depicts a dispensing apparatus 400a having a dual barrel syringe body arrangement 402a, it will be appreciated that the scope of the invention is not so limited, and encompasses a dispensing apparatus having any number of barrels, such as one, two, three or more, for example. While FIG. 6B depicts a dispensing apparatus 400a having two equally sized barrels 404a, 406a and two equally sized pistons 100, it will be appreciated that the scope of the invention is not so limited, and encompasses a dispensing apparatus having two or more different sized barrels for dispensing multiple components in different mix ratios. A notable difference between dispensing apparatus 400a and dispensing apparatus 400 can be seen at the dispensing nozzles 416a, 418a, which in the dispensing apparatus 400a are configured as two half-cylinder discharge ports conjoined at the center to form a cylindrical discharge port 440 having outer screw threads 450 configured to threadably receive an auxiliary discharge apparatus (not shown), such as a static mixing chamber for example.

Figure 7:
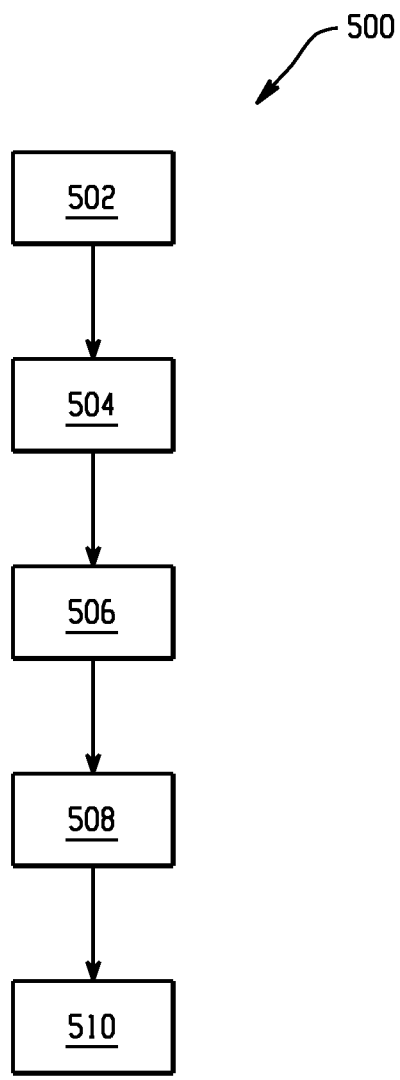
FIG. 7 depicts a method of making a piston of FIGS. 1 and 2, in accordance with an embodiment of the invention.

With reference now to FIG. 7, a method 500 of making a piston 100 in accordance with an embodiment disclosed herein will now be described.

At block 502, a flowable thermoplastic material is injected into a cavity of a closed mold until the cavity is filled with the flowable thermoplastic material. The closed mold, having a first side closed upon a second side along a first axis, defines the cavity that is dimensioned to form the piston 100. The mold also includes first and second slider plates that are closed in molding engagement with the cavity along a second axis perpendicular to the first axis.

At block 504, subsequent to the action at block 502, the flowable thermoplastic material is substantially cured in the cavity to form the piston. Since thermoplastic resin material may continue to cure after a molded part has been ejected from a molding machine, the part formed by the molding process may only be partially cured, or may be substantially cured, while in the mold.

At block 506, subsequent to the action at block 504, the first and second slider plates are disengaged with respect to the filled cavity in a direction along the second axis perpendicular to the first axis. The first and second slider plates provide a means for integrally forming the second portion 300 with the first portion 200 with the two flexible radially extending bands 110 112 connected therebetween, thereby enabling the formation of the one-piece ventable piston 100.

At block 508, subsequent to the action at block 506, the first and second sides of the mold are separated in a direction along the first axis to expose the molded piston 100.

And at block 510, subsequent to the action at block 508, the molded piston 100 is ejected from the mold.

In an alternative embodiment, the process step at block 504 may be modified so that the flowable thermoplastic material in the cavity is only substantially cured, not fully cured, to a first state of cure. And in conjunction therewith, the subsequent process step at block 508 may be modified so that prior to separating the first and second sides of the mold, the second portion 300 of the piston 100 is pushed or pulled toward the first portion 200, and the flowable thermoplastic material is allowed to further cure in the cavity to form the piston 100 in a second state of cure, after which time the first and second sides of the mold are separated in a direction along the first axis to open the mold. In an embodiment, the pushing or pulling of the second portion 300 toward the first portion 200 includes snap-fit engaging the two projections 310, 312 into the respective orifices 206, 208 while the formed piston 100 is still in the mold. In this manner, material shrinkage coupled with material memory upon cooling of the after-molded piston 100 will facilitate biasing of the seal member 302 toward the first closed position when a filler push rod operably engages with the elongated projection 320 to vent trapped air in the manner described above.

In a further alternative embodiment, the process step at block 508 may be further modified so that in conjunction with the second portion 300 of the piston 100 being pushed or pulled toward the first portion 200, a pin in the rear side of the mold may be used to slightly deform the rear side of the projections 310, 312 (depicted optionally as dashed lines 326 in FIG. 3C), which serves to further secure the snap-fit features 314 in the orifices 206, 208.

With reference now to FIG. 8, an alternative embodiment of a piston 100' is depicted, which is similar to that of piston 100 but absent the snap-fitting projections 310, 312. The section cut depicted in FIG. 8 is similar to the section cuts depicted in FIGS. 3B, 4B and 5B, with the pressure plate portion 304' and flexible radially extending bands 110', 112' having structures similar to the counterpart elements 304, 110, 112 depicted in FIG. 1. Like elements among the various figures are numbered alike using primed numbers in FIG. 8 as a means of distinguishing elements of piston 100' from like elements of piston 100. For example, elements identified by reference numerals 100', 110', 112', 200', 202', 204', 214', 216', 220', 222', 300', 302', 306', 320', 322', and 324' depicted in FIG. 8 correlate with elements identified by reference numerals 100, 110, 112, 200, 202, 204, 214, 216, 220, 222, 300, 302, 306, 320, 322, and 324 depicted in FIGS. 1-5C.

To form the piston 100' of FIG. 8 using an injection molding process in a mold similar to that described above in connection with FIG. 7, but with the mold now having a pull-pin movable along the first axis and axially oriented with respect to an axis of the elongated projection 320' of the second portion 300', the aforementioned step 508 of method 500 may be modified as follows. Subsequent to the aforementioned step 506, the pull-pin of the mold is disengaged in a direction along the first axis with respect to the filled cavity thereby forming the axially oriented cavity 324' in the elongated projection 320', the second portion 300' is pushed or pulled toward the first portion 200', and the flowable thermoplastic material is allowed to further cure in the cavity to form the piston 100' in a second state of cure, after which time the first and second sides of the mold are separated in a direction along the first axis to open the mold. By disengaging the pull-pin before the flowable thermoplastic material is fully cured, material shrinkage coupled with material memory upon cooling of the after-molded piston 100' will facilitate biasing of the seal member 302' toward the first closed position when a filler push rod operably engages with the elongated projection 320' to vent trapped air in the manner described above. Other steps of method 500 as described above in the forming of piston 100 also apply to the forming of piston 100'. It is also contemplated that use of the aforementioned pull-pin in a mold to form piston 100' could also be used in a mold to form piston 100, which would result in forming the axially oriented cavity 324 depicted in FIG. 3B.

Figure 9A:
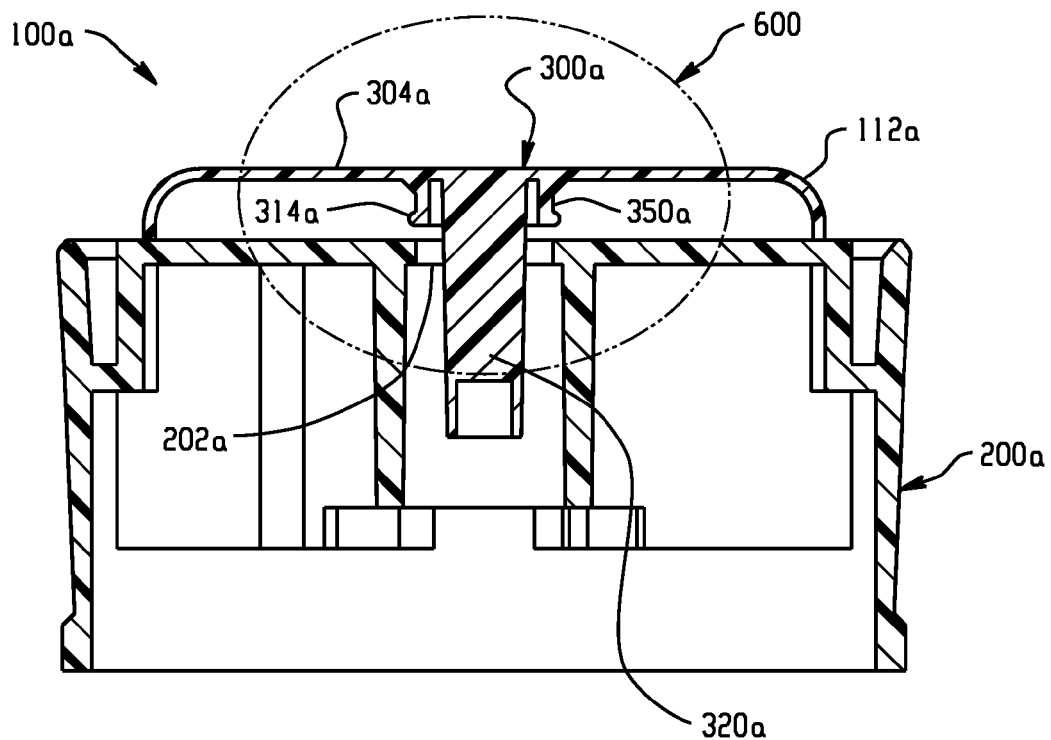
FIG. 9A depicts a section view of an alternative piston to that of FIGS. 1, 2 and 8, in a pre-closed intermediate molded state, in accordance with an embodiment of the invention.
Figure 9B:
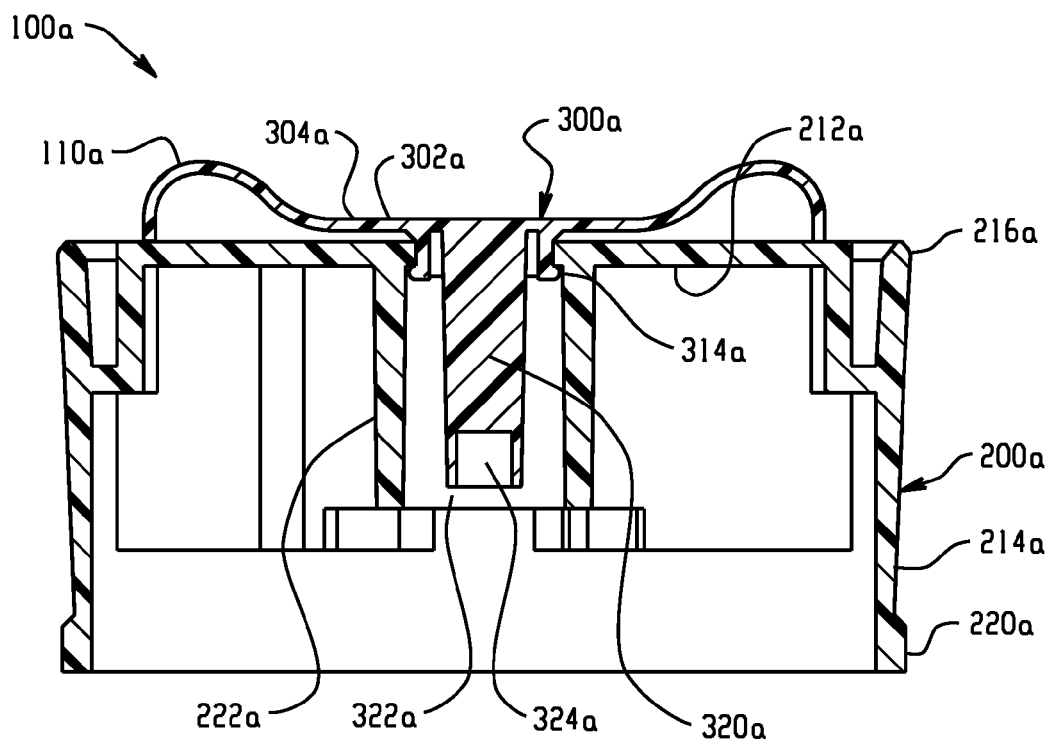
FIG. 9B depicts a section view of the piston of FIG. 9A in a first closed position, in accordance with an embodiment of the invention.
Figure 9C:
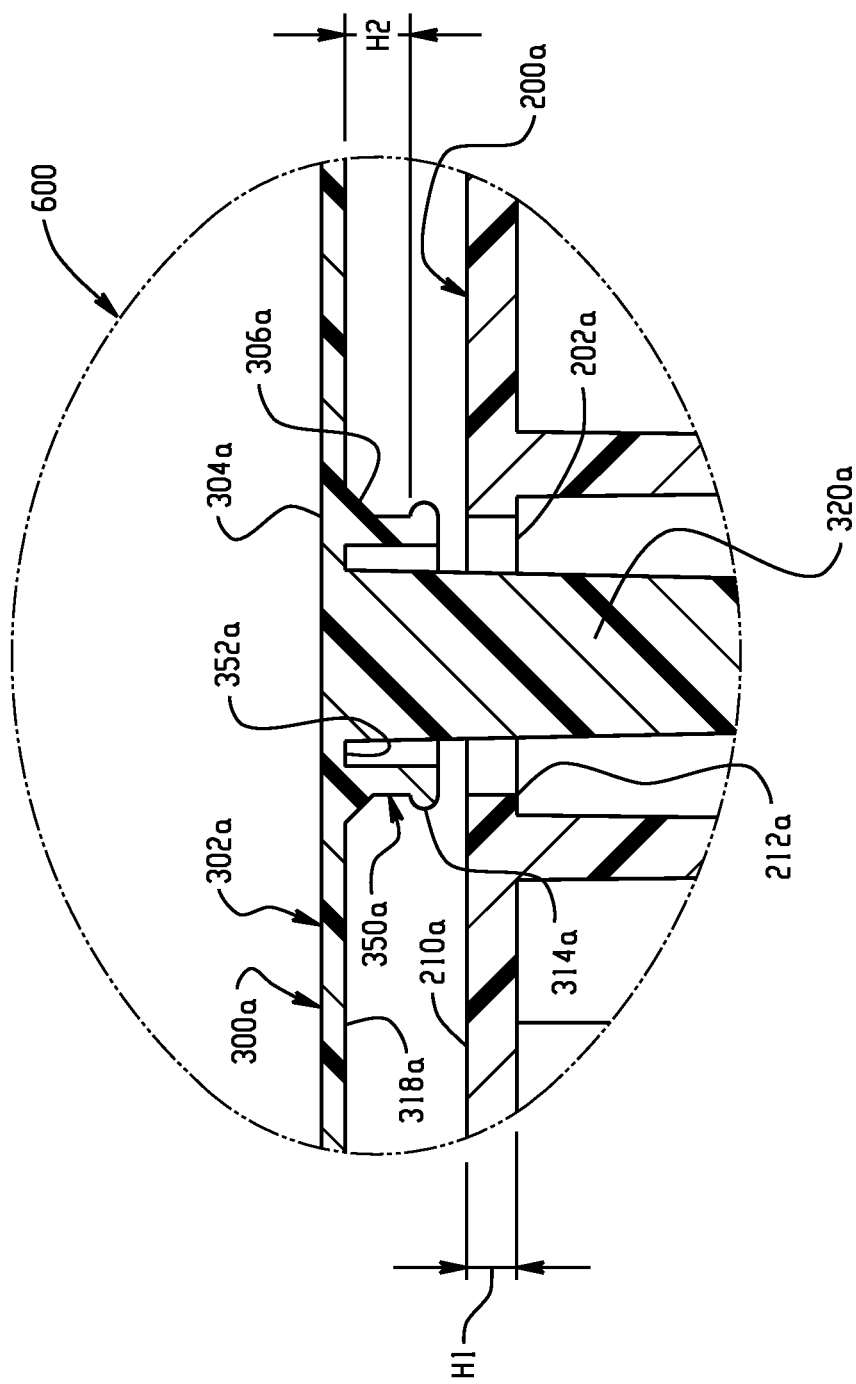
FIG. 9C depicts a section view of detail 600 depicted in FIG. 9A, in accordance with an embodiment of the invention.

With reference now to FIGS. 9A, 9B and 9C, an alternative embodiment of a piston 100a is depicted, which is similar to that of piston 100 but instead of having snap-fitting projections 310, 312, piston 100a has a snap-fit cylindrical extension 350a (also herein referred to as a projection), which is best seen with reference to FIG. 9C and is discussed in more detail below.

The section cuts depicted in FIGS. 9A and 9B are similar to the section cuts depicted in FIGS. 3B, 4B and 5B, with the pressure plate portion 304a and flexible radially extending bands 110a, 112a having structures similar to the counterpart elements 304, 110, 112 depicted in FIG. 1. Similar to FIG. 5B, FIG. 9A depicts the piston 100a in a pre-closed intermediate molded state prior to the snap-fit cylindrical extension (projection) 350a having been snap-fit into its respective orifice 202a. Other like elements among the various figures are numbered alike using an "a" suffix added to reference numerals in FIGS. 9A, 9B and 9C as a means of distinguishing elements of pistons 100 from like elements of piston 100a. For example, elements identified by reference numerals 100a, 110a, 112a, 200a, 202a, 204a, 214a, 216a, 220a, 222a, 300a, 302a, 306a, 314a, 320a, 322a, and 324a depicted in FIGS. 9A, 9B and 9C correlate with elements identified by reference numerals 100, 110, 112, 200, 202, 204, 214, 216, 220, 222, 300, 302, 306, 314, 320, 322, and 324 depicted in FIGS. 1-5C.

FIGS. 9A and 9C depict the piston, and detail 600 of the piston, 100a in a pre-closed as-molded state similar to the piston 100 depicted in FIGS. 5A, 5B and 5C, where the second portion 300a is not yet snap-fit engaged with the first portion 200a. FIG. 9B depicts the piston 100a having the second portion 300a snap-fit engaged with the first portion 200a, as evidenced by a peripheral projection 314a being engaged with the rear surface 212a of the second portion 200a, which will now be discussed with reference to FIG. 9C in combination with FIGS. 9A and 9B.

Referring now to FIG. 9C, an embodiment is configured such that the dimension H2 between the rear surface 318a and the peripheral projection 314a of the second portion 300a is greater than the dimension Hi between rear surface 212a and the front surface 210a of the first portion 200a, which provides for the snap-fit engagement configuration depicted in FIG. 9B, and also provides for a slight separation between the rear surface 318a of the second portion 300a and the front surface 210a of the first portion 200a when an axial force is exerted on the end 322a of the elongated projection 320a to drive the piston 100a from a first closed position to a second open position to allow trapped air to escape from the dispensing apparatus during a fill operation, as discussed above in connection with FIGS. 1-6. Additionally, the dimensions H1 and H2 are so dimensioned and configured such that a seal between the circumferential chamfer 306a and a top edge of the orifice 202a (best seen with reference to FIG. 9C), sufficient for a purpose disclosed herein, is formed between the first 200a and second 300a portions when they are snap-fit engaged with each other in a first sealed position, and elastic deformation of the second portion 300a relative to the first portion 200a, sufficient for a purpose disclosed herein, may occur when an axial force is exerted on the end 322a of the elongated projection 320a to drive the piston 100a from a first closed position to a second open position to allow trapped air to escape from the dispensing apparatus passed the chamfer 306a, now separated from the orifice 202a, during a fill operation.

Similar to the discussion above in connection with FIGS. 3B, 3C, 4B and 4C, when the second portion 300a is disposed in a first closed position (see FIG. 3B in view of FIG. 9B for example), the seal member 302a of the second portion 300a is disposed in a sealed arrangement with the orifice 202a of the first portion 200a, facilitated via chamfer 306a, and when the second portion 300a is disposed in a second open position (see FIG. 4B in view of FIG. 9B for example), the seal member 302a of the second portion 300a is disposed in an unsealed arrangement with the orifice 202a of the first portion 200a.

Referring still to FIG. 9C, an embodiment includes an arrangement where the peripheral projection 314a outwardly protrudes from an end of the cylindrical extension 350a that extends downward from the seal member 302a and forms a cylindrical annular space 352a between the cylindrical extension 350a and the elongated projection 320a. The cylindrical annular space 352a provides an elastic strain relief so that as the second portion 300a is snap-fit engaged with the first portion 200a, an interference fit between the peripheral projection 314a and the inner edge of the orifice 202a results in compressive elastic deformation of the cylindrical extension 350a that relaxes back to substantially its original shape once the first and second portion 200a, 300a are snap-fit engaged with each other, as depicted in FIG. 9B. In the embodiment of FIGS. 9A, 9B, 9C, when the second portion 300a is disposed in a first sealed position relative to the first portion 200a, the outer surface of the cylindrical extension 350a of the second portion 300a is disposed in a slideable non-sealing arrangement with the inner circumference of the orifice 202a of the first portion 200a, which facilitates the expulsion of trapped air, as discussed above, when the second portion 300a is pushed to a second unsealed position via exertion of an axial force on the end 322a of the elongated projection 320a.

From the foregoing, it will be appreciated that the orifice 202a and the cylindrical extension 350a with peripheral projection 314a depicted in FIGS. 9A, 9B and 9C, provide the same function as do the engagement features in the form of two orifices 206, 208 and the reciprocal engagement features in the form of two projections 310, 312, each having snap-fit features 314, depicted in FIGS. 3A, 3B, 3C, 4A, 4B, 4C, 5A, 5B and 5C. As such, reference herein to the terms engagement feature(s) and reciprocal engagement feature(s) is equally applicable to the embodiments of FIGS. 1, 2, 3A, 3B, 3C, 4A, 4B, 4C, 5A, 5B, 5C, 9A, 9B and 9C.

From the foregoing, it will also be appreciated that the piston 100a may be manufacturing using the molding process steps disclosed herein and described in detail above.

A suitable flowable and curable thermoplastic material for producing pistons 100, 100', 100a is a resin selected to provide resistance to degradation by the material to be placed in the dispensing apparatus 400, which includes polyolefins, polyamides, and polypropylene. However, other materials suitable for a purpose disclosed herein are also considered within the scope of the invention.

While certain combinations of features relating to a piston have been described herein, it will be appreciated that these certain combinations are for illustration purposes only and that any combination of any of these features may be employed, explicitly or equivalently, either individually or in combination with any other of the features disclosed herein, in any combination, and all in accordance with an embodiment of the invention. Any and all such combinations are contemplated herein and are considered within the scope of the invention disclosed.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A piston, comprising:
a one-piece body having a first portion and a second portion, the second portion being integrally formed with the first portion, being flexibly movable between a first position and a second position relative to the first portion, and being biased toward the first position;
wherein the first portion comprises an orifice;
wherein the second portion comprises a seal member;
wherein when the second portion is disposed in the first position, the seal member is disposed in a sealed arrangement with the orifice; and
wherein when the second portion is disposed in the second position, the seal member is disposed in an unsealed arrangement with the orifice.

2. The piston of claim 1, wherein:
when the second portion is disposed in the second position, the one-piece body comprises a gas flow passage structurally configured to permit gas flow from a front side of the second portion to a rear side of the first portion through the orifice.

3. The piston of claim 1, wherein:
the first portion comprises an engagement feature;
the second portion comprises a reciprocal engagement feature; and
when the second portion is disposed in each of the first position and the second position, the reciprocal engagement feature is constrained by the engagement feature.

4. The piston of claim 3, wherein the engagement feature is a first engagement feature and the reciprocal engagement feature is a first reciprocal engagement feature, and further wherein:
the first portion comprises a second engagement feature;
the second portion comprises a second reciprocal engagement feature; and
when the second portion is disposed in each of the first position and the second position, the second reciprocal engagement feature is constrained by the second engagement feature.

5. The piston of claim 4, wherein:
the first and second engagement features comprise respective first and second orifices;
the first and second reciprocal engagement features comprise respective first and second projections; and
when the second portion is disposed in each of the first position and the second position, the first and second projections are disposed within respective ones of the first and second orifices.

6. The piston of claim 5, wherein:
the first and second projections each comprise a snap-fit feature; and
when the second portion is disposed in each of the first position and the second position, each of the snap-fit features are disposed in snap-fit engagement with a respective one of the first and second orifices.

7. The piston of claim 6, wherein:
the second portion is integrally formed with the first portion via a plurality of flexible radially extending bands that facilitate in biasing the second portion toward the first position; and
the first and second projections are disposed on respective ones of the plurality of flexible radially extending bands.

8. The piston of claim 3, wherein:
the engagement feature comprises the orifice centrally disposed on the first portion;

the reciprocal engagement feature comprises a cylindrical extension that extends downward from a rear side of the second portion, the cylindrical extension comprising a peripheral projection that outwardly protrudes from an end of the cylindrical extension.

9. The piston of claim 1, wherein the seal member comprises:
   a plate portion disposed on a front side of the second portion;
   a peripheral projection disposed on a rear side of the plate portion;
   wherein when the second portion is disposed in the first position, the peripheral projection is disposed in a sealed arrangement with the orifice of the first portion; and wherein when the second portion is disposed in the second position, the peripheral projection is disposed in an unsealed arrangement with the orifice of the first portion.

10. The piston of claim 1, wherein:
    the first portion comprises a front surface, a rear surface, and a peripheral wall surface;
    the second portion comprises a front surface and a rear surface;
    the rear surface of the second portion is disposed oriented toward the front surface of the first portion; and
    the peripheral wall surface extends between a front side and a rear side of the first portion and comprises a first circumferential seal member disposed proximate the front side of the first portion.

11. The piston of claim 10, wherein:
    the first portion comprises an annular space disposed between the first circumferential seal member and the front surface.

12. The piston of claim 10, wherein:
    the peripheral wall surface comprises a second circumferential seal member disposed proximate the rear end of the first portion.

13. The piston of claim 1, wherein:
    the second portion is integrally formed with the first portion via a plurality of flexible radially extending bands that facilitate in biasing the second portion toward the first position.

14. The piston of claim 1, wherein:
    the first portion comprises a front side and a rear side, and a circumferential wall disposed around a perimeter of the orifice, the circumferential wall having an end that extends toward the rear side of the first portion; and
    the second portion comprises an elongated projection disposed within the circumferential wall of the first portion, the elongated projection having an end that extends further toward the rear side of the first portion than does the end of the circumferential wall of the first portion when the second portion is disposed in the first position.

15. The piston of claim 14, wherein:
    the elongated projection of the second portion comprises an axially oriented cavity open to an end at the rear side of the elongated projection.

16. A method of making a piston according to claim 15, the method comprising:
    in a closed mold that defines a cavity, the mold having a first side closed upon a second side along a first axis, the mold having a pin movable along the first axis and axially oriented with respect to an axis of the elongated projection of the second portion, the mold having first and second slider plates closed in molding engagement with the cavity along a second axis perpendicular to the first axis, injecting a flowable thermoplastic material into the cavity and filling the cavity with the flowable thermoplastic; then
    curing the flowable thermoplastic material in the cavity to form the piston in a first state of cure; then
    disengaging in a direction along the second axis the first and second slider plates with respect to the filled cavity; then
    disengaging in a direction along the first axis the pin with respect to the filled cavity, pushing or pulling the second portion toward the first portion and curing the flowable thermoplastic material in the cavity to form the piston in a second state of cure, and separating in a direction along the first axis the first and second sides of the mold to open the mold; and then ejecting the piston from the mold.

17. The piston of claim 1, wherein the seal member comprises:
    a plate portion disposed on a front side of the second portion;
    an elongated projection that extends downward from a rear side of the plate portion;
    a cylindrical extension that extends downward from a rear side of the plate portion and forms a cylindrical annular space between the cylindrical extension and the elongated projection;
    a peripheral projection that outwardly protrudes from an end of the cylindrical extension;
    wherein when the second portion is disposed in the first position, an outer surface of the cylindrical extension is disposed in a slidable non-sealing arrangement with an inner circumference of the orifice of the first portion, and the peripheral projection is disposed on a rear side of the first portion; and
    wherein when the second portion is disposed in the second position, the outer surface of the cylindrical extension remains disposed in a slidable non-sealing arrangement with an inner circumference of the orifice of the first portion, and the peripheral projection remains disposed on a rear side of the first portion.

18. The piston of claim 17, wherein the seal member further comprises:
    a chamfer disposed between a base of the cylindrical extension and the rear side of the plate portion; and
    wherein when the second portion is disposed in the first position, the chamfer is sealably disposed with respect to the orifice of the first portion.

19. A dispensing apparatus, comprising:
    a hollow barrel shaped body having an inner wall and a discharge opening at one end, the inner wall defining a boundary of a cavity of the body; and
    a piston according to claim 1 slidably disposed within the cavity.

20. The dispensing apparatus of claim 19, comprising:
    a first of the hollow barrel shaped body having a first of the piston disposed in the cavity of the first hollow barrel shaped body;
    a second of the hollow barrel shaped body having a second of the piston disposed in the cavity of the second hollow barrel shaped body; and
    wherein the first and the second hollow barrel shaped bodies are conjoined.

21. A method of making a piston according to claim 1, the method comprising:
    in a closed mold that defines a cavity, the mold having a first side closed upon a second side along a first axis, the mold having first and second slider plates closed in molding engagement with the cavity along a second axis perpendicular to the first axis, injecting a flowable thermoplastic material into the cavity and filling the cavity with the flowable thermoplastic; then substantially curing the flowable thermoplastic material in the cavity to form the piston; then disengaging in a direction along the second axis the first and second slider plates with respect to the filled cavity; then separating in a direction along the first axis the first and second sides of the mold to open the mold; and then ejecting the piston from the mold.

22. The method of claim 21, wherein:

the substantially curing comprises substantially curing the flowable thermoplastic material in the cavity to form the piston in a first state of cure; and the separating comprises pushing or pulling the second portion toward the first portion and curing the flowable thermoplastic material in the cavity to form the piston in a second state of cure, and then separating in a direction along the first axis the first and second sides of the mold to open the mold.

23. The method of claim 22 as applied to the piston of claim 3, wherein the pushing or pulling the second portion toward the first portion further comprises:

deforming a rear side of the reciprocal engagement feature of the second portion to further secure the reciprocal engagement feature of the second portion with the engagement feature of the first portion.

* * * * *